Oct. 19, 1965  W. HOPPE  3,213,277
APERTURED CORRECTING DIAPHRAGM TO REDUCE ASTIGMATISM
IN ELECTRON LENS SYSTEM
Filed July 12, 1962  3 Sheets-Sheet 1

$r = 43,53 \mu$ $\vartheta_g = 13,1909 \cdot 10^{-3}$ $d_{min} = 1,402 \text{ Å}$ INVENTOR
WALTER HOPPE
By Toulmin & Toulmin
ATTORNEYS $$r = 50{,}97\mu$$
$$\vartheta_g = 15{,}445 \cdot 10^{-3}$$
$$d_{min} = 1{,}198 \text{ Å}$$

INVENTOR
WALTER HOPPE

By Toulmin & Toulmin

ATTORNEYS

Oct. 19, 1965 W. HOPPE 3,213,277
APERTURED CORRECTING DIAPHRAGM TO REDUCE ASTIGMATISM
IN ELECTRON LENS SYSTEM
Filed July 12, 1962 3 Sheets-Sheet 3

Inventor
WALTER HOPPE
By Toulmin & Toulmin
Attorneys

United States Patent Office

3,213,277
APERTURED CORRECTING DIAPHRAGM TO REDUCE ASTIGMATISM IN ELECTRON LENS SYSTEM
Walter Hoppe, Munich, Germany, assignor to Siemens & Halske Aktiengesellschaft, Berlin, Germany, a German company
Filed July 12, 1962, Ser. No. 209,394
Claims priority, application Germany, July 15, 1961,
H 43,137
3 Claims. (Cl. 250—49.5)

The most important application of the present invention is for the correction of lens errors in electron-optical systems. Since the invention is based on general optical interference principles, it can be applied not only to the correction of any corpuscular optical system but also to the correction of conventional ("light-optical") lens systems. Here however, it is of less technical importance since in the visible range different means of correction are available and the invention in any case presupposes monochromatic light. The invention is of particular significance in the construction of electron microscopes having resolutions in the atomic order since it enables correction of the apertural error and of axial astigmatism, i.e. of those errors which are still making the attainment of a theroretical resolution of less than 3 Angstrom units impossible. True, there are already theoretical ways of reducing the lens errors limiting this resolution (e.g. the arrangement of additional electromagnetic or elecrostatic cylindrical lenses in the lens system). However, such arrangements are complicated in structure and very sensitive to errors of adjustment. Lens systems corrected in accordance with the invention contain, by way of contrast, a single lens of usual construction and the adjustment of the correcting element is not critical.

The lens system correcting element of the invention, is essentially comprised by an apertured correcting diaphragm, situated in the path of the lens system, having fields which are alternately opaque and transparent in respect of the rays (this diaphragm can, for example, take the form of an apertured diaphragm in the lens system of an electron microscope), the alternately opaque and transparent fields being so arranged that the elementary wavelets going from the image-end wave surface of the lens system and intersecting an image plane at any space point are so filtered that only elementary wavelets of unidirectional phase intersect the space point. In order to make the physical operation of such a diaphragm arrangement easier to understand, it is best to compare it with that of a Fresnel zone plate. This too comprises a diaphragm having fields which are alternately opaque or transparent (these fields taking the form of concentric rings), these fields being so arranged that the elementary wavelets intersecting a space point in an image plane are so filtered that only elementary wavelets of unidirectional phase intersect the space point. Unlike the invention however, zone plates are "image-forming" and not "correcting" optical elements.

The zone plate is used without a lens system for image-forming, the alternately opaque and transparent rings so deflecting the waves incident on the zone plate that bent rays of different order meet at an image point. Thus, for the zone plate it is essential that the change of direction, characteristic of an image-forming system, of the ray proceeding from the point on the object to the image point, is carried out by diffraction. However, in accordance with the invention the change of direction is brought about by refraction. Looking at it from the "optical wave" point of view, the optical system changes the form of the spherical wave coming from the point on the object. If the system reproduces faultlessly, then the altered wave front again has the form of a sphere, the new wave front no longer, of course, having its center in the point on the object but in the image point. Every point on the wave front can now be regarded as a point of departure for elementary wavelets. Since the wave front has a spherical form, all elementary wavelets intersect the image point with the same phase; the form of the picture point can be calculated by Fourier superposition of these elementary wavelets. On the other hand, if the image-forming system is not error-free, then the image-end wave front is no longer spherical. For this reason, the distances of the individual points of the wave front from the image point are no longer constant and the elementary wavelets proceeding from the wave front arrive with phase differences which, in accordance with the form of the wave front and the choice of the point of emanation of the elementary waves on the wave front, can amount to several times the wavelength. In accordance with the invention, the correcting diaphragm contains a series of opaque and transparent fields which are so arranged that the transparent fields filter out elementary wavelets which would intersect the image point in anti-phase. Thus, in the image point, only elementary wavelets of unidirectional phase are summed; this is similar to what occurs in an error-free image-forming system. True, a part of the elementary wavelets, and consequently of the Fourier components, are missing in the formation of the image point. Nevertheless, it can be shown that the absence of these Fourier components in the arrangements of alternate transparent and opaque fields in the correcting element of the invention does not essentially influence the form of the image point. The form and nature of the series of fields is dependent upon the form of the wave front.

The correcting element can, in accordance with the invention, take the form of a flat plate which can with advantage be situated in the apertured correcting diaphragm of the optical system. As will be known, each point in the aperture of an apertured correcting diaphragm corresponds with a specific point of departure of an elementary wavelet on the image-point of departure of an elementary wavelet on the image-end wave front. In calculating the distribution of the transparent and opaque fields in the apertured correcting diaphragm, the distance of the point of departure from the image point must be calculated for each point within the aperture (and consequently for each point of departure on the wave surface). The center of the aperture defines the point of departure of the axial ray $S_0$. If we let $\gamma$ represent the wave length of the image-forming ray, then the phase difference $\phi$ (with respect to the axial ray) of each elementary wavelet intersecting the image point is given by $$\phi = 2\pi(S-S_0)\gamma$$

Elementary wavelets of rectified phase $\phi_g$ are defined as being all those waves for which the following holds:

$$\phi_g = \phi_0 + (n+\xi)2\pi$$

where $$0 < \xi \leq a$$
$$a \leq \tfrac{1}{2}$$

$\phi_0$ is an arbitrary phase constant, $n$ is a whole number (either positive or negative), $\xi$ is a number lying within a constant number range $a$. The number range $a$ is smaller than or equal to $\tfrac{1}{2}$; it is recommended that $a$ be chosen equal to $\tfrac{1}{2}$. The rest of the waves are elementary wavelets in anti-phase $\phi_u$ (for which the condition for $\phi_g$ does not hold). Therefore, $\phi_u$ we have:

$$\phi_u = \phi_0 + (n+\xi')2\pi$$

where $$a < \xi' < 1$$

For constant values of $n$, the corresponding points of departure of the elementary wavelets, and consequently the corresponding diaphragm points, lie in bounded areas (fields). The fields $\phi_u$ are filtered out (insofar as they are within the aperture of the apertured correcting diaphragm) so that only the fields $\phi_g$ can pass rays.

By way of exemplary embodiments of the invention, two correcting plates for correction of the apertural error in electron microscope lens systems will be cited. The lens should be corrected for points on the lens axis. It is assumed that the axial astigmatism will be adequately compensated by anastigmat devices. The image-end wave front is then a surface of rotation about the lens axis. Because of this rotational symmetry, both $\phi_g$ and $\phi_u$ are constant for points of departure of elementary wavelets which lies on circles on the wave front concentric with the lens axis. Thus, the $\phi_g$ (like the $\phi_u$) ranges of the apertured correcting diaphragm have the form of circles. Because of the rotational symmetry it is sufficient to treat the conditions in any arbitrary plane through the lens axis. We shall take the point of intersection of the lens axis with the Gauss plane as the origin of a system of Cartesian coordinates and make the $x$-axis coincident with the lens axis (negative $x$-direction towards the lens). Then, the generatrix of the image-end wave front (in the field-free space) can be represented, in accordance with W. Glaser (see Physik 121 (1943) 647), by the equation $$y = C_1 \sin \theta - 2c \tan$$
$$x = C_1 \cos \theta - c \tan^2 \theta + 2c$$

In this equation, $C_1$ represents an arbitrary length constant for the distance of the wave surface from the image point (since it is permissible and easy to imagine the wave surface as being very far from the image point, $C_1$ approaches infinity) and $c$ a constant depending on the apertural error which, for magnetic electron lenses for example, is calculated by $$c = V^4 C_0''$$

($V$=magnification, $C_0''$=apertural error constant of the lens system.) $\theta$ is the angle subtended by the normal to the tangent at the point $x, y$ on the wave front, with respect to the $x$ axis (lens axis). If the image point of the corrected system is coincident with the image point of the coaxial rays (intersection of the lens axis with Gauss plane), then, for the phase difference $\phi$, neglecting sixth order terms of $\theta$, we obtain:

$$\phi = \frac{\pi}{2\lambda} C \theta^4$$

For $C \to \infty$ $\theta$, is equal to the angle of the connecting line from point $x, y$ to the Gauss image point. This connecting line can be considered as one of the "rays" intersecting the Gauss image point; $\theta$ is then the aperture angle of this ray, $\phi$ is the phase difference with respect to the axial ray. $\theta$ varies from $0°$ (for the axial ray coincident with the lens axis to the value $\theta_{max}$ ($\theta_{max}$ is the image-end aperture angle of the lens system). Using the conditions given above for the phase shifts $\phi_u$ of the anti-phase elementary wavelets, the angles $\theta$ of the rays which are to be filtered out can be calculated. Once the $\theta$ values are known, the maskings corresponding to these angles in the aperture of the apertured correcting diaphragm (which maskings have the form of rings) can straightaway be found.

The deduction shows that the correcting element of the invention is superficially similar to a zone plate since, like the latter, it is constituted by a system of rings concentrically located with respect to one another. The physical difference already cited at the beginning, makes itself evident in the different sequence of the rings. In the case of a zone plate, the angles $\theta$ (and consequently the radii of the successive rings) are proportional to the square roots of whole numbers. In the embodiment of the correcting elements as discussed, they are, however, proportional to the fourth roots of whole numbers. Further, the combination of lens and correcting element in accordance with the invention possesses only a single image plane (this in contrast to zone plates which have several image planes). Finally, in the matter of intensity, this combination is far in advance of the zone plate since for the purpose of deflecting the rays, it uses diffraction instead of the refraction process, which so poorly exploits the potential intensity. It should be emphasized that the apertural error in the combination of correcting element and lens of the invention should not be regarded so much as an error but rather as a physical means of producing a radial order of phase differences. It is a fact of decisive importance for technical realization that correcting plates, which, in conjunction with suitable electromagnetic lenses, permit resolution figures of under 1 Angstrom unit, have ring widths in the order of magnitude of microns. Similar zone plates for the same resolution would, however, have ring widths in the order of atomic distances.

Drawings are appended hereto showing, to a much enlarged scale, embodiments of the present invention, and wherein—

Figure 1:
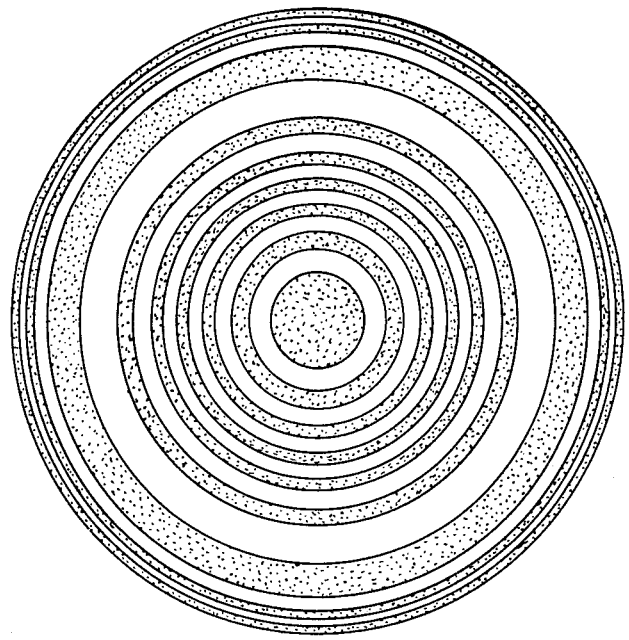
FIGURES 1 and 2 show alternative forms of concentric or alternate annular rings and openings for two correcting elements.
Figure 2:
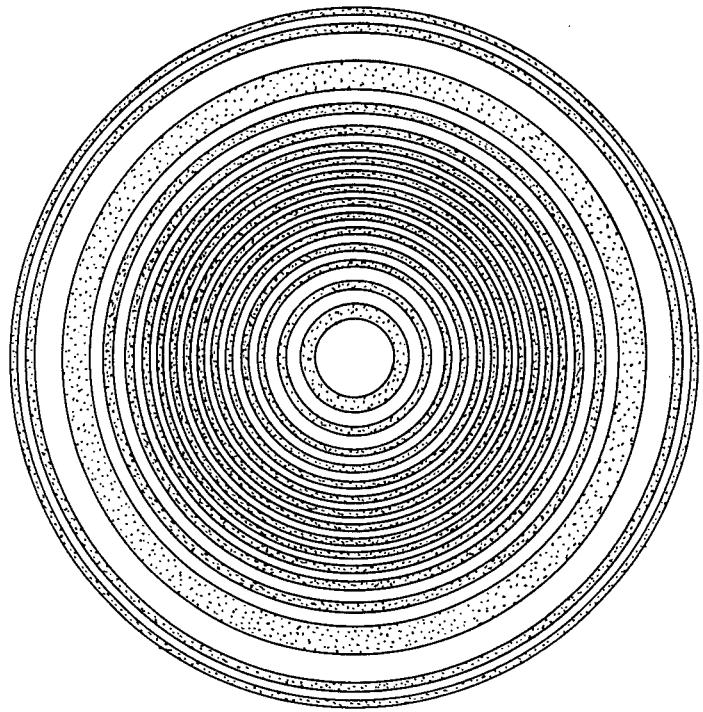
Figure 3:
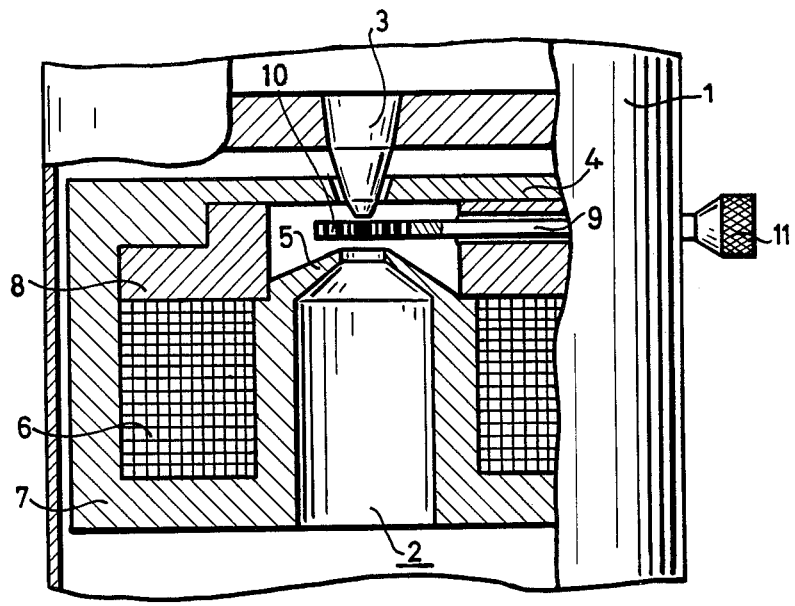
FIGURE 3 is a broken sectional elevation showing the relative components of an electron microscope incorporating the present invention.
Figure 4:
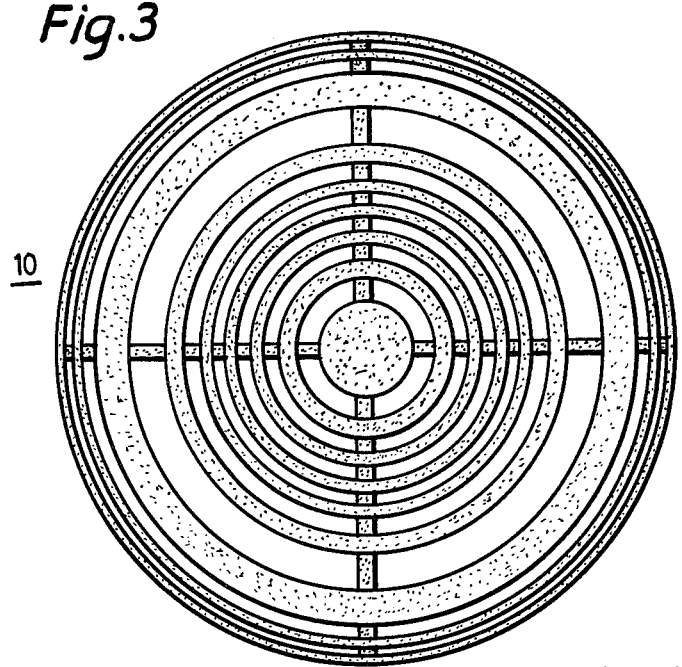
FIGURE 4 shows the connecting pieces between individual non-conductive zones of a correcting element.

Referring to the drawings, inside the housing 1 of the vacuum chamber of the electron microscope, is situated the lens 2, in this case the objective lens, this being arranged beneath the objective mounting 3. The lens 2 consists essentially of the upper pole piece 4, the lower pole piece 5, the lens winding 6 and the surrounding magnetic return 7 which conveys the magnetic flux to the pole piece and away from it. The pole pieces 4 and 5 are spaced apart by a more or less plate-shaped non-magnetic component 8. Between the pole pieces 4 and 5 is situated the aperture diaphragm 10, mounted for example in the diaphragm control 9, which in accordance with the invention is constructed to have several electron conductive zones in the special arrangemnet already described.

The lens construction described and the diaphragm system which can be moved transversely in relation to the axis of the unit by means of the drive system 11, are already known.

If, for example, a correction plate is calculated in accordance with the relations given, for the objective lens of the Siemens electron microscope Elmiskop I ($C_0''$=3.3 mm. $V$=27), with an arrangement of 16 rings in the correcting element an object-end aperture of $2.9 \times 10^{-2}$ can be achieved. At a beam voltage of 100 kv., this aperture corresponds to a resolution of 0.77 Angstrom unit.

The second embodiment of the invention differs from the first in that the image point is on the lens axis but shifted towards the Gauss image point (a) By a distance $u$ towards the the lens or
(b) By a distance $u$ away from the lens.

Case (a) is of special practical interest particularly when the image point is situated between the Gauss image point and the image point of the boundary rays of the lens (e.g. in the picture plane of the circle of smallest distortion). A derivation similar to that obtained for the first exemplary embodiment gives, for the $\theta$—dependence of the phase shift $\phi$ (for case a; in case b the sign of the second term should be changed):

$$\phi = \frac{\pi}{2\lambda} C \theta^4 - \frac{\pi}{\lambda} u \theta^2$$

For convenience, the distance $u$ can be formally represented by the expression $$u = C\theta_0^2$$

$u$ is the distance between the image point of the boundary rays and the Gauss image point, for a lens having the image-end aperture angle $\theta_0$ (compare Glaser, loc. cit.). From this we obtain:

$$\phi = \frac{\pi}{2\lambda} C\theta^2(\theta^2 - 2\theta_0^2)$$

For given $\phi$ values, the corresponding $\theta^2$ values can be obtained by solution of a quadratic equation. Correction elements in accordance with the second embodiment require fewer rings for the same resolution. By suitable choice the parameter $\theta_0$ it is possible to achieve the result that the ring width does not decrease so rapidly with increasing $\theta$ value as in embodiment 1. A correction plate for the objective lens of the Elmiskop I already mentioned as an example in the case of embodiment 1, gives an object-end aperture of $3 \times 10^{-2}$ with 10 rings (for $\theta_0 = 9.07 \cdot 10^{-4}$). Table 1 gives the values corresponding to an alteration of one wavelength $$(= 3.7 \cdot 10^{-2} \text{A.})$$

Table 1 lists the $\theta$ values corresponding to a $\phi$ change of one wavelength (. . .)

Table 1

| $n$ | $\theta \cdot 10^4$ | $a$ | $\theta \cdot 10^4$ |
|---|---|---|---|
| 0 | 0.00 | 6 | 6.55 |
| 1 | 2.31 | 7 | 7.31 |
| 2 | 3.32 | 8 | 9.00 |
| 3 | 4.15 | 9 | 10.53 |
| 4 | 4.81 | 10 | 11.10 |
| 5 | 5.66 | | |

Thus, the table gives the $\theta$ values for successive pairs of light and dark rings. The width ratio of light to dark rings is established by the constant $a$. It goes without saying that the correction elements can also be built in exactly the same way for electrostatic lenses.

Up to now, the embodiments concerned the correction of lenses without axial astigmatism. It is however self-evident that simliar calculations could also be carried out when axial astigmatism is present. The wave front is then no longer rotationally symmetrical; its form must generally be determined experimentally. The rings, as curves of like phase, then change to curves the form of which is dependent upon the structure of the axial astigmatism.

It is possible also to correct generalised electron-optical image-forming systems (e.g. multipole lenses) in accordance with this principle. This means of correction is of particular significance for cylindrical lenses; in this case the curves of like phase are parallel to the lens cylinder. The calculation of the diaphragm systems can obviously be reapplied for this purpose.

What I claim as my invention and desire to secure by Letters Patent of the United States is:

1. A system for at least partially overcoming the disturbing effect produced in an image formed by electron-optical means due to apertural and axial astigmatism in an electron-optical lens system through which the image-forming rays pass and are directed along a path toward an arbitrary space point on an image plane, said system including a correcting diaphragm positioned in said path, said diaphragm comprising a plurality of radially spaced electron opaque parts and means maintaining said parts in radial spaced relation to form a plurality of concentric alternate opaque and transparent zones providing several electron admissive zones arranged in such a manner that of those elementary image side waves which emanate from the wave surface which is created in the lens system and are directed through said correcting diaphragm along said path toward said arbitrary space point on said image plane, only those waves of unidirectional phase are permitted to reach the said point due to the filtering action of said correction diaphragm.

2. Correcting elements for lens systems in accordance with claim 1, wherein to counteract the axial lens error, the space point is situated at the intersection of the lens axis with the Gauss image plane.

3. Correcting elements for lens systems in accordance with claim 1, wherein to counteract the axial lens error, the space point is situated on the lens axis between the Gauss image plane and the intersection point of the boundary rays of said lens.

References Cited by the Examiner

UNITED STATES PATENTS

| 2,494,442 | 1/50 | Le Poole | 250—49.5 |
| 2,735,018 | 2/56 | McLachlan | 250—53 |
| 3,045,530 | 7/62 | Tsujiuchi | 88—57 X |

RALPH G. NILSON, *Primary Examiner.*

FREDERICK M. STRADER, *Examiner.*